Patented June 1, 1943

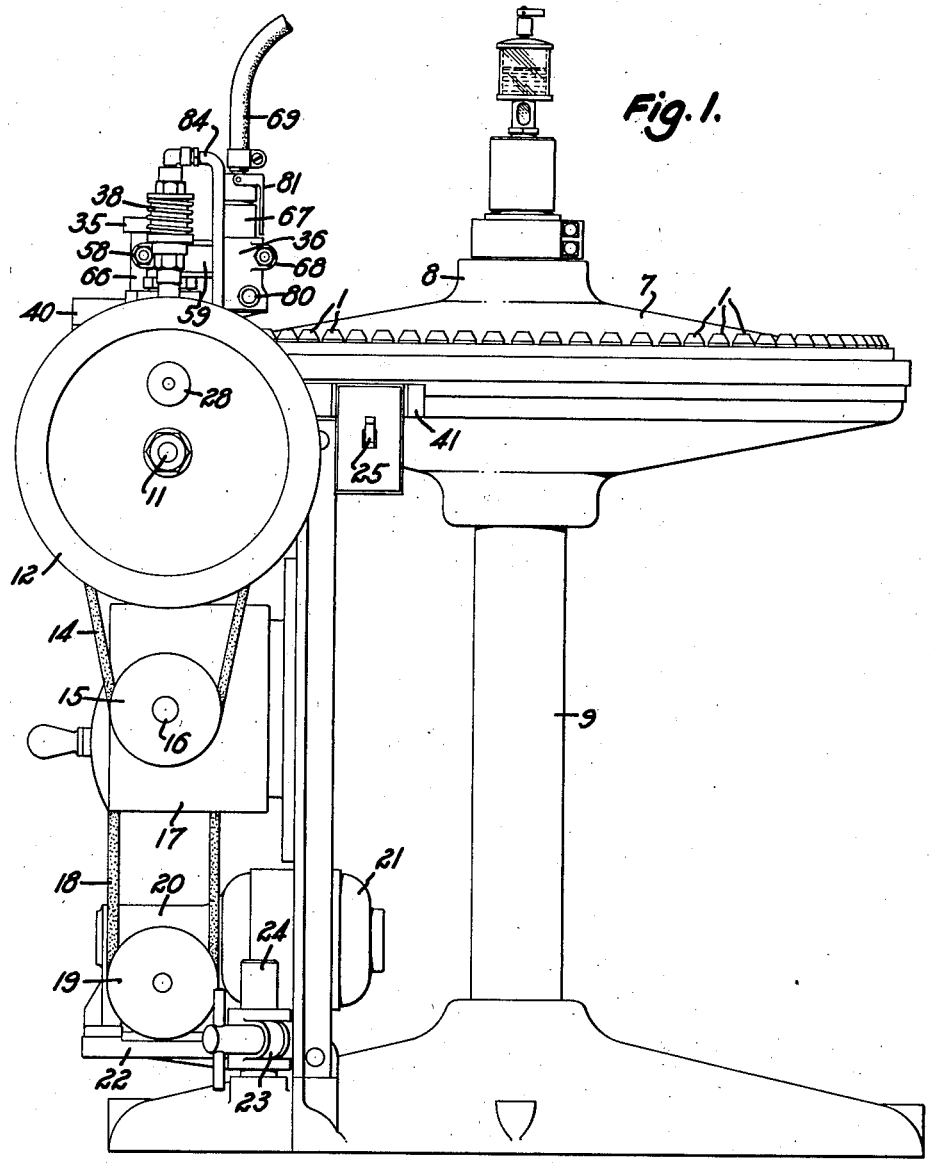

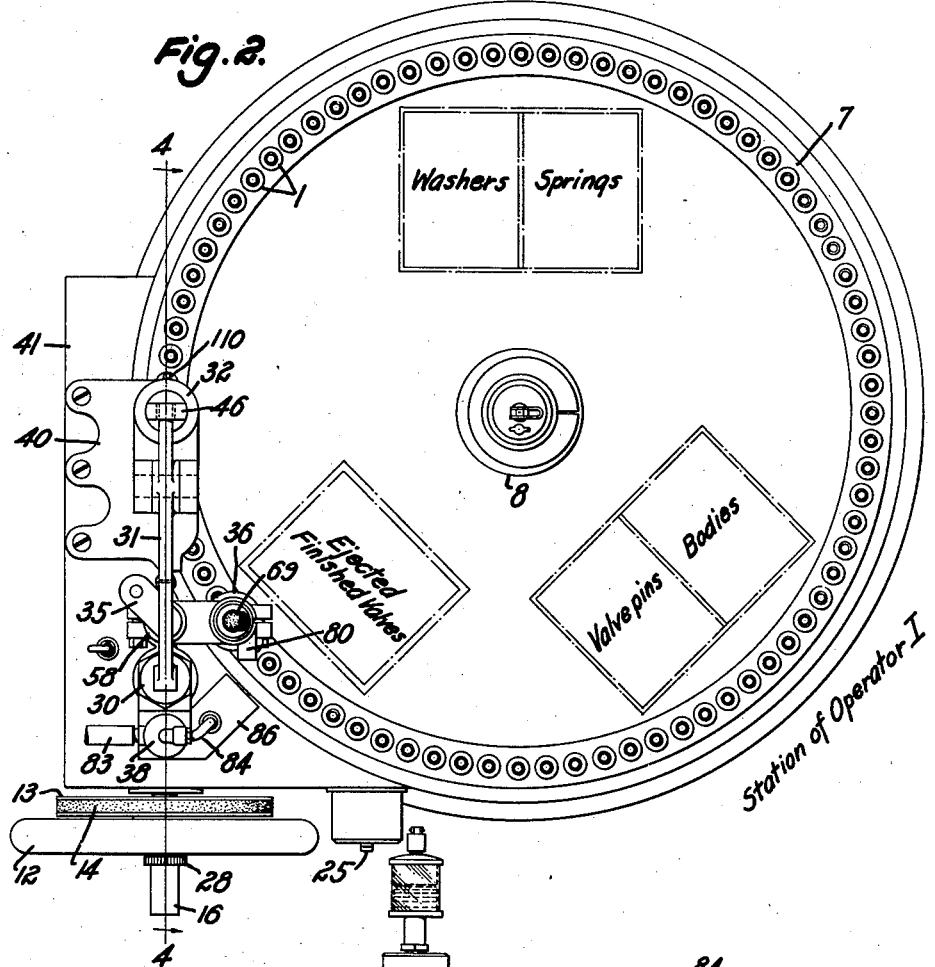
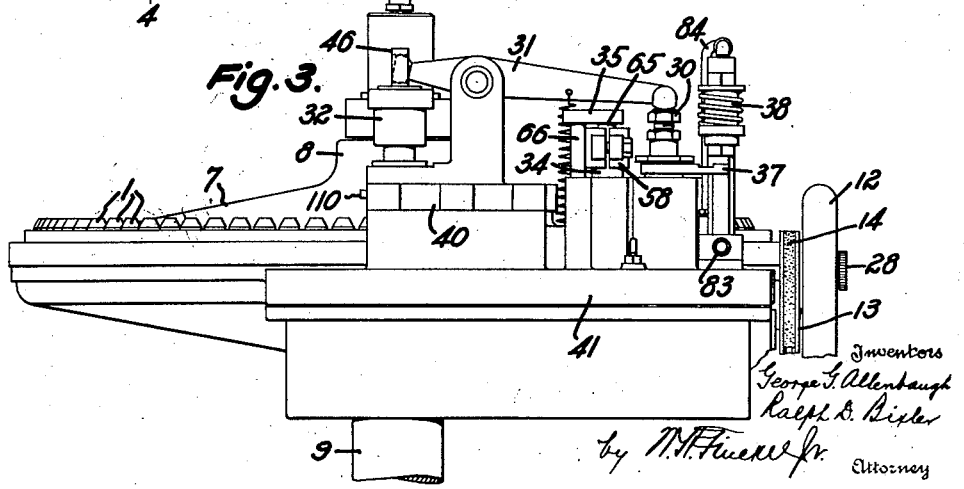

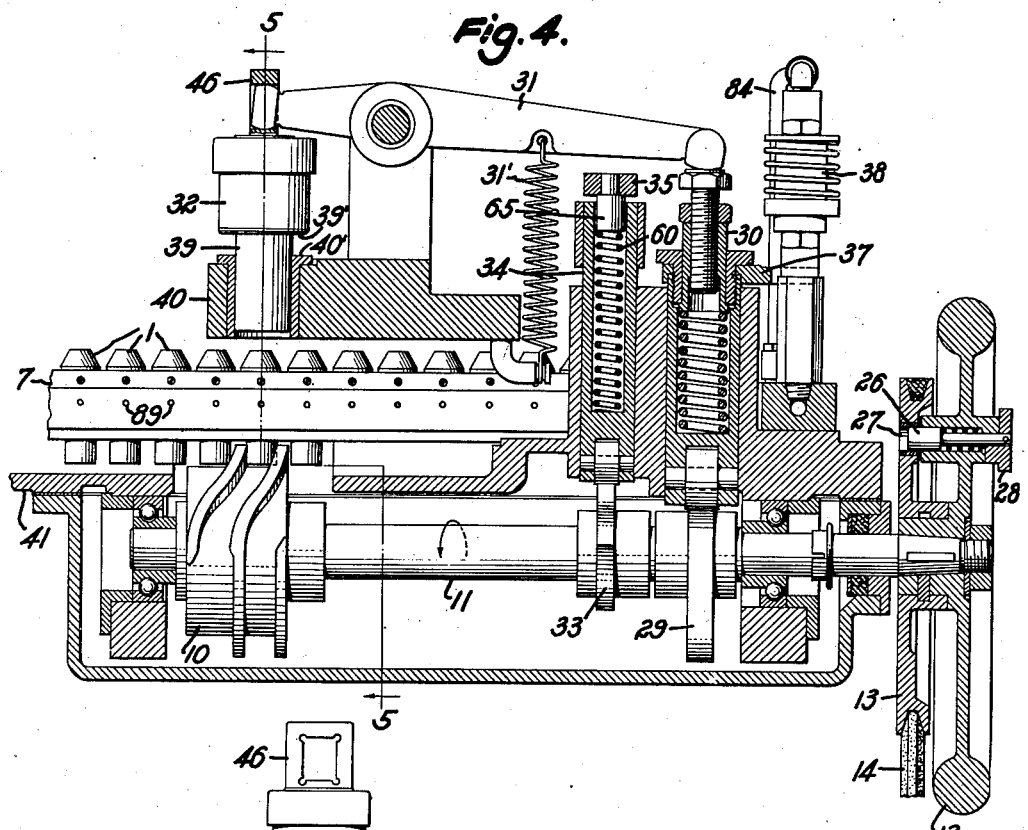

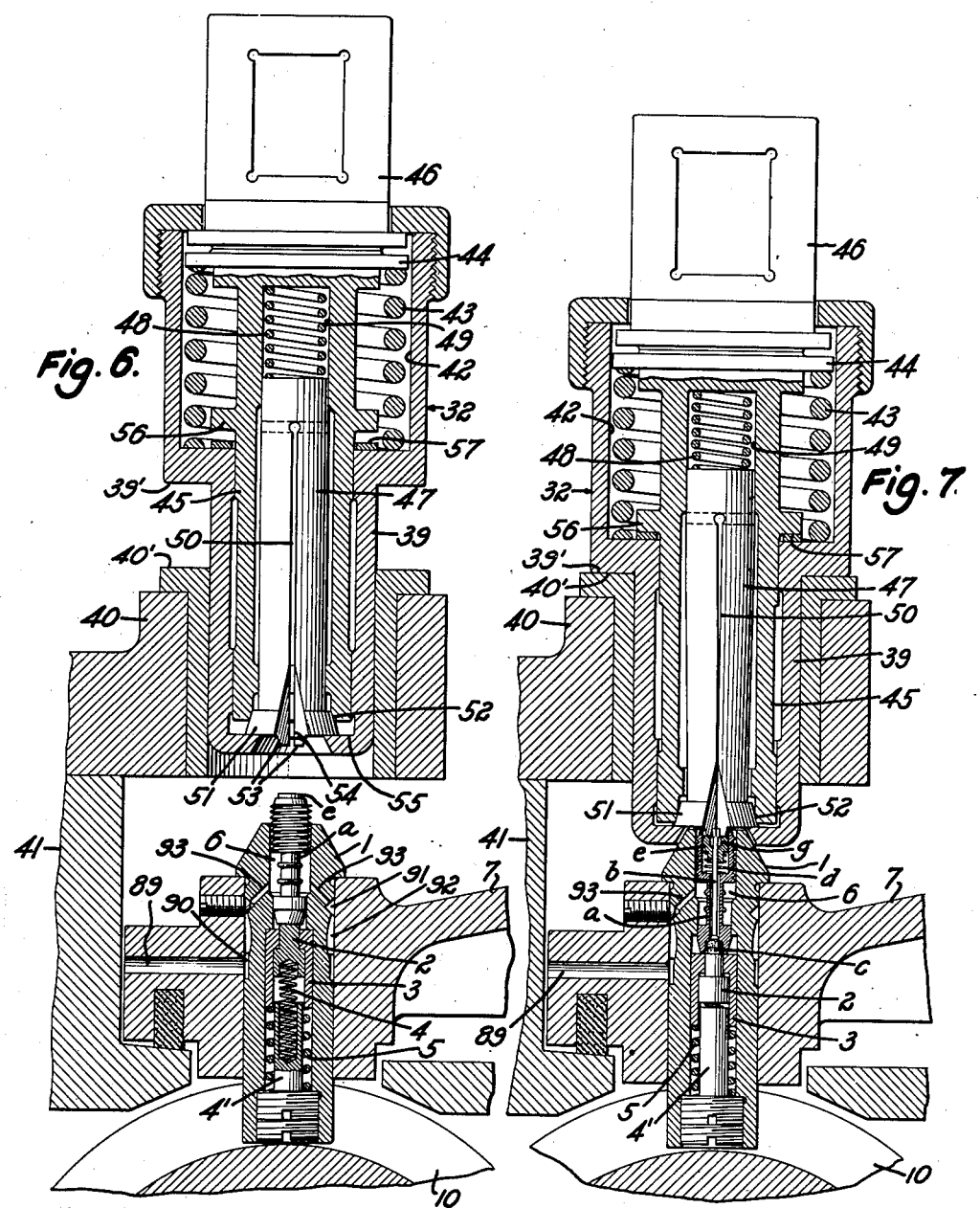

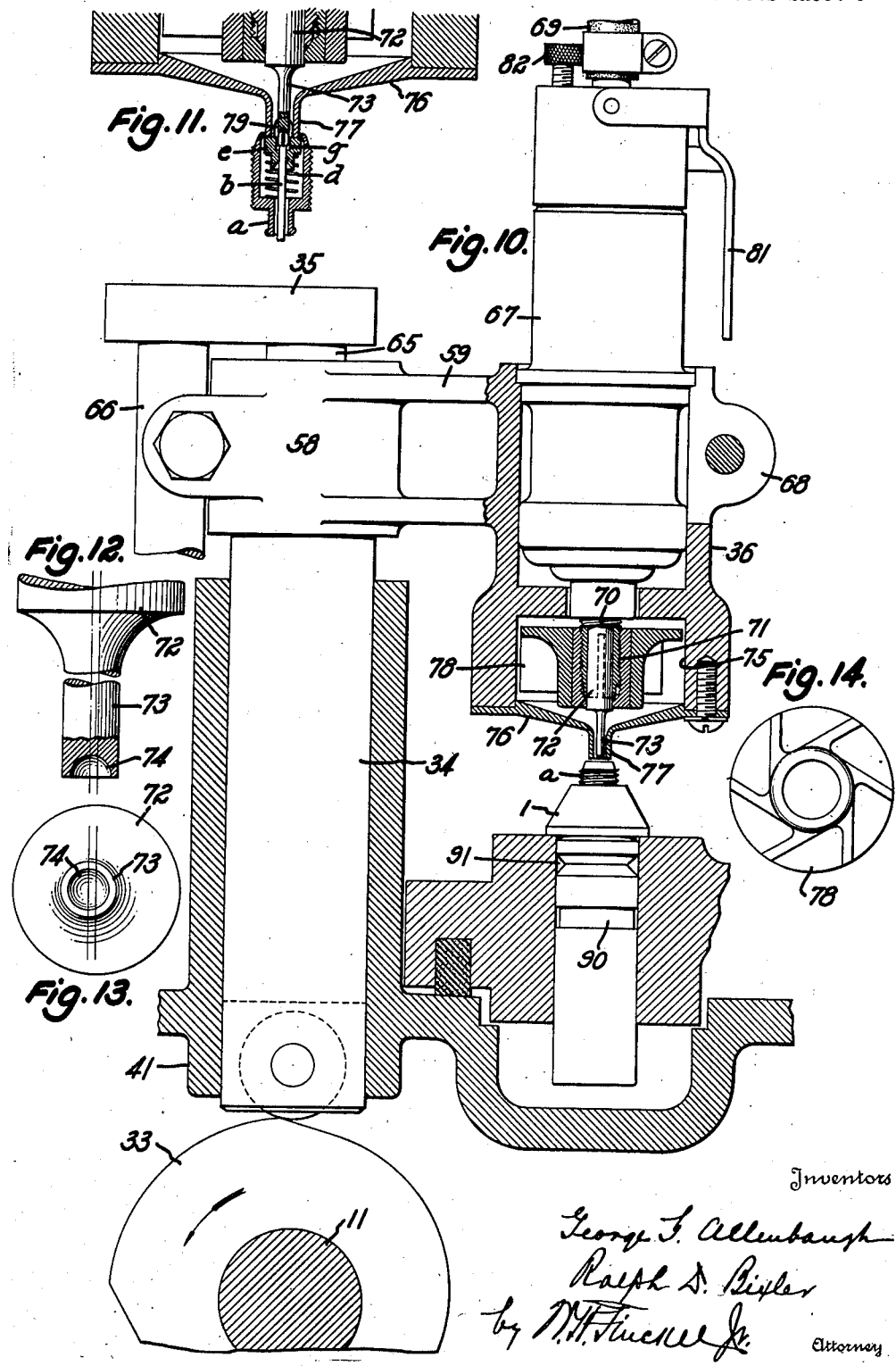

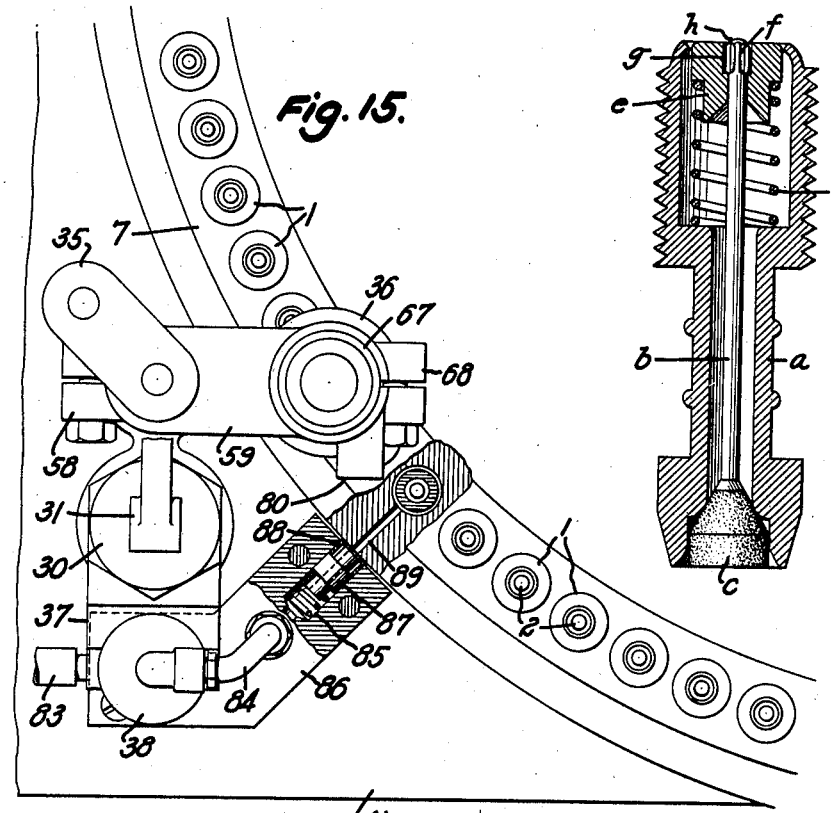

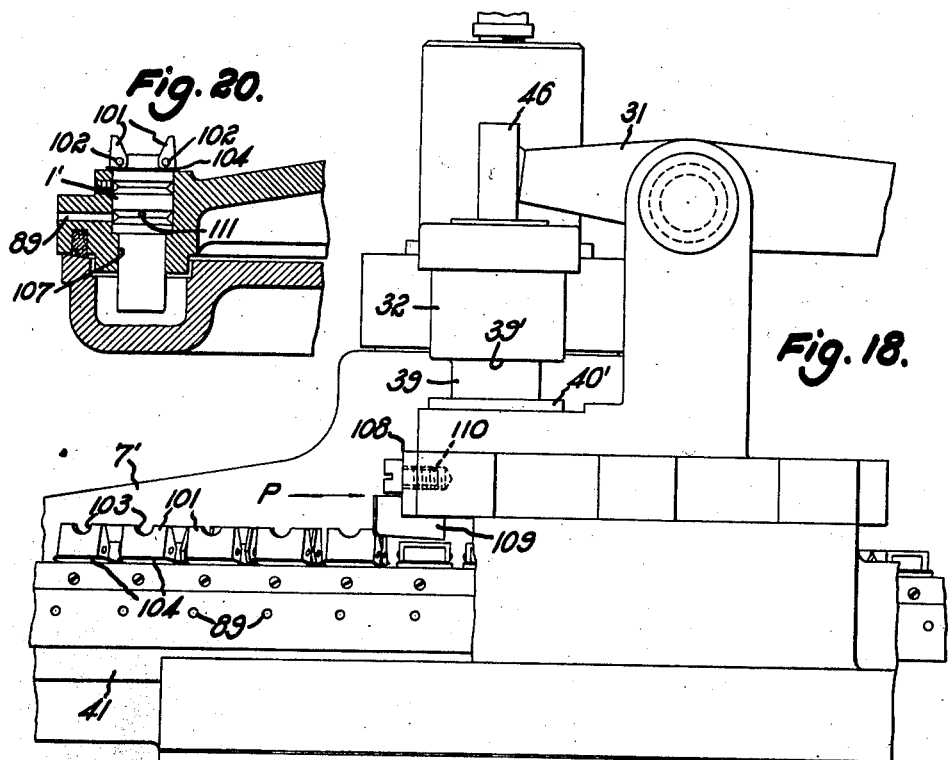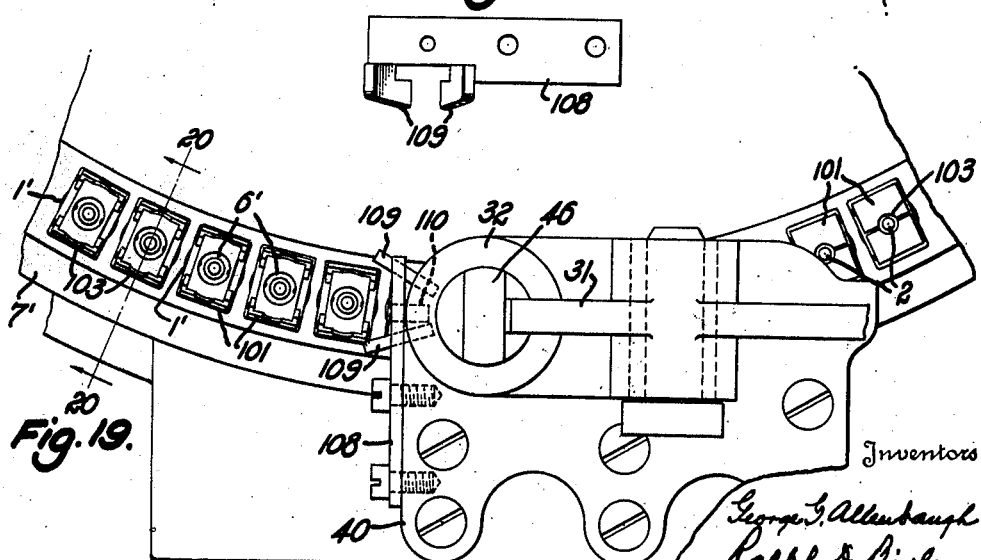

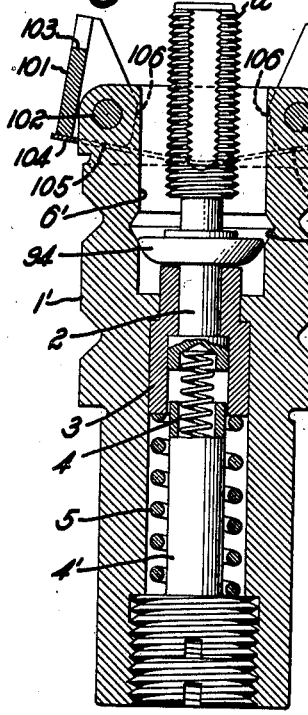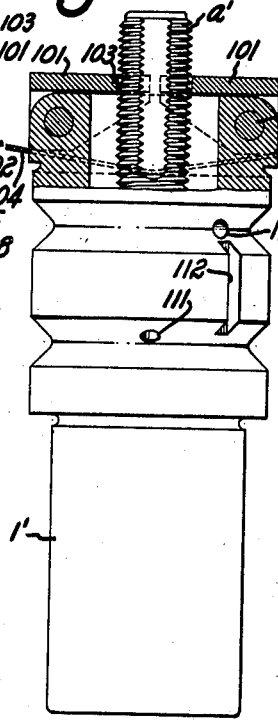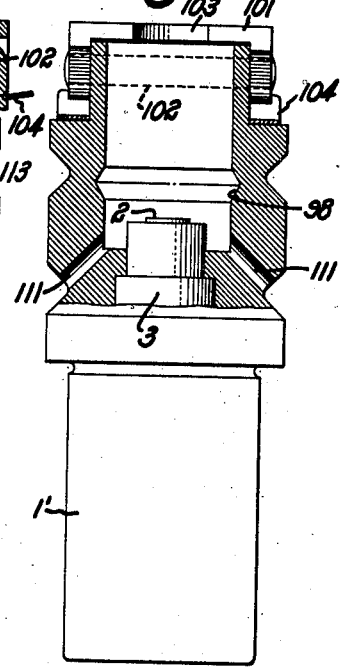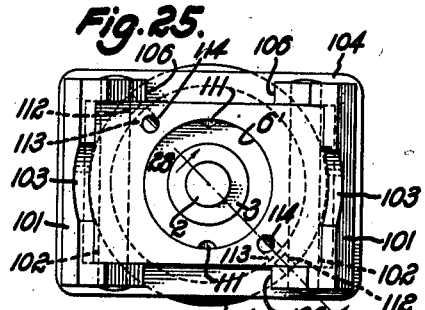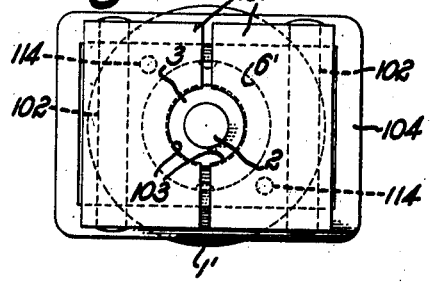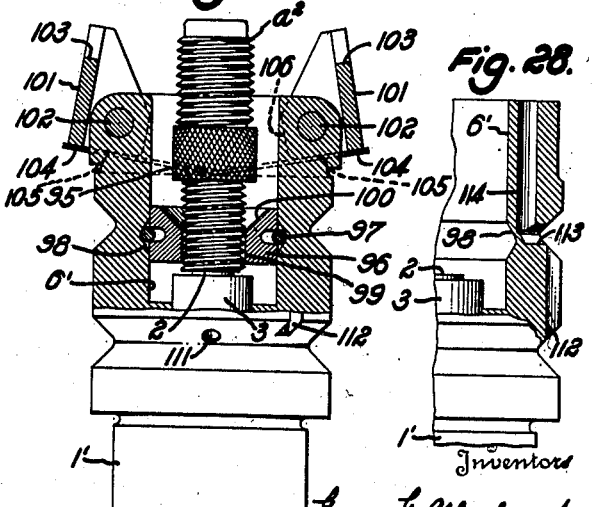

2,320,452

UNITED STATES PATENT OFFICE 2,320,452

METHOD OF AND MACHINE FOR ASSEMBLING INFLATION VALVE PARTS

George G. Allenbaugh and Ralph D. Bixler, Wadsworth, Ohio, assignors to The Ohio Injector Company, Wadsworth, Ohio, a corporation of Ohio Application May 2, 1940, Serial No. 333,036

17 Claims. (Cl. 29—33)

This invention relates to a method of and apparatus for assembling inflation valve parts, particularly those parts including a core member or body, and a valve pin or stem, spring and washer or cap assembled therewith, substantially of the types hereinafter particularly referred to. But it will be understood that the method and apparatus of the invention are susceptible of use in assembling valve parts of other types so long as their characteristics of assembly are substantially similar.

One object of the invention is to assemble the valve parts in proper association for effective functioning, and to perform finishing operations thereon to produce a product attractive to the trade and capable of the most efficient service.

Another object is to provide for automatic performance of the assembling and finishing operations so that a uniform product may be expeditiously produced.

Hence, the invention contemplates a method and apparatus whereby the parts of a plurality of inflation valves, each including a core or body, a valve-carrying pin or stem, a valve spring, and a washer or cap engaging the spring and pin, may be brought together in appropriate operative relation, and the valve pin thereafter operated upon to swage or deform its washer-engaging end portion so that it will be enlarged and separation of the valve pin, washer and valve spring from the core or body will be prevented, and these parts properly located axially within the body, a further operation being performed upon the swaged or deformed terminal of the pin to smooth or burnish it and give it desired shape. And the invention contemplates, further, various features of the apparatus whereby the operations referred to are carried out in a step-by-step, continuous manner, and the finished valve assemblies automatically ejected for collection, all as will be explained hereinafter more fully and finally claimed.

In the accompanying drawings illustrating the invention, in the several figures of which like parts are similarly designated, Figure 1 is a side elevation of the complete apparatus of the invention.

Fig. 2 is a plan view thereof.

Fig. 3 is a fragmentary side elevation looking from a point substantially 90° to the left of the apparatus as viewed in Fig. 1.

Fig. 4 is a fragmentary sectional elevation taken substantially on the line 4—4 of Fig. 2, the cams being shown in the position assumed just upon completion of the indexing operation.

Fig. 5 is a sectional elevation taken substantially on the line 5—5 of Fig. 4.

Figs. 6 and 7 are enlarged fragmentary sectional elevations illustrating details of construction of the apparatus and the operation of the valve pin swaging or deforming mechanism.

Fig. 8 is a greatly enlarged end view of the swaging tool.

Fig. 9 is a fragmentary section of the swaging tool taken substantially on the line 9—9 of Fig. 8.

Fig. 10 is an enlarged fragmentary sectional elevation of the mechanism for spinning or burnishing the swaged or deformed terminals of the valve pins.

Fig. 11 is a further enlarged sectional elevation illustrating the spinning or burnishing operation.

Fig. 12 is a fragmentary sectional elevation of the spinning tool.

Fig. 13 is a bottom end view of the spinning tool.

Fig. 14 is a bottom end view of the air impeller or fan member of the spinner head.

Fig. 15 is an enlarged fragmentary plan view, with parts in section, illustrating the air-operated ejecting mechanism.

Fig. 16 is a cam diagram.

Fig. 17 is a greatly enlarged axial sectional elevation of a valve assembly of one specific type for operation upon which the apparatus of the invention is adapted.

Fig. 18 is an enlarged fragmentary side elevation showing the application of means whereby the apparatus is adapted for operation upon specific types of valve assemblies the cores or bodies of which are different from that shown in Fig. 17.

Fig. 19 is a plan view of the parts shown in Fig. 18.

Fig. 20 is a section taken substantially on the line 20—20 of Fig. 19, the chuck being shown in elevation.

Fig. 21 is a detail elevation of the plow means, detached, looking in the direction of the arrow P, Fig. 18.

Fig. 22 is a greatly enlarged axial sectional elevation of the chuck of Figs. 18 and 19 with a specifically different type of valve core or body arranged therein, the positioning flaps being shown open.

Fig. 23 is a view similar to Fig. 22, but showing the positioning flaps closed.

Fig. 24 is a sectional elevation of the chuck of Figs. 22 and 23 rotated through 90°.

Fig. 25 is a top plan view of the chuck as shown in Fig. 22, with the valve core or body removed.

Fig. 26 is a top plan view of the chuck as shown in Fig. 23, with the valve core or body removed.

Fig. 27 is an axial sectional elevation of the chuck of Figs. 22 to 26 but fitted with an adapter to accommodate it to the reception of an additional specific type of valve core or body shown therein, and Fig. 28 is a fragmentary sectional elevation taken on the line 28—28 of Fig. 25.

Although the core or body of the valve assembly may take a variety of shapes and dimensions to accommodate it to the particular installation for which it may be adapted, as will be apparent from the cores or bodies shown at $a$, $a'$ and $a^2$ in Figs. 17, 22 and 27, respectively, the arrangement of the valve pin $b$ carrying valve element $c$, and valve spring $d$ and washer $e$ within the core or body will be substantially the same as that most clearly illustrated in Fig. 17, and it is to these parts, and particularly to the outer end portion and terminal of the valve pin $b$ that the method and apparatus of the invention are directed, whereby this end of the valve pin may be swaged or deformed and expanded, as shown at $f$, so that it will seat in the complemental recess $g$ of the washer $e$, and may have its terminal $h$ spun or burnished to a smooth domed contour. Thus is accomplished the assembly of the valve pin $b$—$c$, spring $d$ and washer $e$ within the core or body $a$, and operative with respect thereto, to provide an effective finished inflation valve element.

As hereinbefore stated, the method and apparatus of the invention are directed to the assembly of the inflation valve parts, and to this end the apparatus includes means for receiving, in proper association, a plurality of individual assemblies of core members or bodies, valve pins or stems with their applied valve elements, valve springs and washers or caps, the valve springs when in fully distended or expanded condition being insufficient in length to cause ejection of the washers from the bores of the valve bodies and disengagement of the washers from the adjacent outer end portions of the valve pins. These means comprise a plurality of chucks 1 or 1' (see particularly Figs. 6 and 7, and 22 to 27), each of which includes spring-pressed plungers 2 and 3, the springs 4 and 5 of which, respectively, are of relatively different compression strength, so that the plunger 2 will be depressed prior to depression of the plunger 3, as will hereinafter be referred to more in detail. An abutment element or stop 4' limits depression of the plunger 2.

These spring-pressed plungers, and particularly plunger 2, normally support within the bores 6 or 6' of the chucks of Figs. 6 and 22 respectively, the valve bodies or cores $a$, $a'$ or $a^2$ in the position illustrated in Figs. 6, 22 and 27 respectively, the operative end of the plunger 2 engaging the valve element $c$ of the valve pin (see Fig. 7), whereby the assemblies of the valve parts are resiliently supported within the chucks 1 or 1'.

A plurality of these chucks 1 or 1' are arranged in annular series adjacent to the periphery of a carrier disk 7 (Fig. 1) or 7' (Fig. 19) having a rotative bearing 8 upon a stand 9, and step by step rotation is imparted to this disk by means of an indexing cam 10 keyed to a shaft 11 carrying a hand wheel 12 upon the hub of which is rotatively mounted a pulley or the like transmission member 13 which may be connected by a belt 14 or other suitable gearing with a pulley 15 the shaft 16 of which extends from a reducing gear 17 to which power is imparted through a belt or the like 18 from the pulley 19 of suitable gearing 20, driven from an electric motor 21 or other appropriate source of power. The motor 21 and gearing 20 may be carried by a platform 22 adjustably mounted at 23 upon a standard 24, whereby suitable tension may be imparted to the belt or the like 18, and the motor 21 may be wired to a control switch 25 within easy reach of an operator at station I. Clutch means, including a spring-pressed pin 26 carried by the hand wheel 12 and a complemental socket 27 in the pulley 13, provide for connecting the constantly driven pulley 13 to, and disconnecting it from, the hand wheel 12, which is keyed to the shaft 11, axial movement being imparted to the pin 26 by means of a rotatable button 28.

Also mounted upon the shaft 11 in proper angular relation to each other and to the indexing cam 10 are a cam 29 which, through a spring supported tappet 30, oscillates a rocker arm 31 influenced by a return spring 31' and functioning to impart axial reciprocation to a swaging head 32, and a cam 33 operating through a push rod 34 and spring stop link 35 to control the axial reciprocation of a spinner head 36.

The indexing cam 10 engages the downwardly projecting ends of the chucks 1 or 1', and is so designed that at each rotation of the shaft 11 the carrier disk 7 will be rotated through an angle including the arc between the axes of two adjacent chucks, a dwell being provided in the rotation of the carrier disk 7 or 7' between indexing motions, during which dwell the cams 29 and 33 function, respectively, to perform the operations of swaging or deforming and spinning the ends of the valve pins of two sets of valve assemblies appropriately spaced circumferentially of the carrier disk. The cam 29, in addition to its operation of the tappet 30 which serves to actuate the swaging head, also functions through an arm 37 to actuate a valve mechanism 38 whereby compressed air from a suitable source may be admitted at suitable timed intervals into successively positioned chucks 1 or 1' for blowing the finished valve assemblies therefrom.

The operation of the mechanisms just referred to will now be described separately and in more detail.

Referring particularly to Figs. 6 to 9 inclusive, it will be seen that the swaging head 32 includes a plunger 39 axially reciprocative in a bearing element 40 mounted upon the stationary frame member 41 of the stand 9, this plunger being enlarged at its upper end to provide a chamber 42 in which is mounted a heavy spring 43 bearing at its lower end in the bottom of the chamber and at its upper end engaging the flanged end 44 of a sleeve 45 capable of relative axial movement within the plunger 39. Against the upper end of the sleeve 45 bears the bottom of a yoke member 46 engaged by the operative end of the rocker arm 31. Within the sleeve 45 is mounted the cylindrical swaging tool 47 backed up by a spring 48 which bears against the end of the bore 49 of the sleeve 45.

The swaging tool is provided with slits 50 upon two diameters normal to each other to give it desired resiliency for radial compression, and bears at its lower end a substantially annular chamfered camming face 51 in cooperative engagement with a complementally chamfered internal face 52 of the sleeve 45. The four resilient jaws of the swaging tool are provided with downwardly extending lugs 53, the inwardly facing opposed edges 54 of which provide the swaging elements of the tool as will be later explained. It will be noted, by reference particularly to Fig. 6, that the lower end of the swaging tool 47 is normally held by the spring 48 in engagement with the bottom 55 of the plunger 39. Hence, when pressure is applied to the swaging head 32 through the rocker arm 31, the first effect thereof will be to move the plunger 39 downwardly until the radial surface 39' thereof engages the surface 40' of the bearing element 40. This movement will result in contact of the lugs 53 with the washer e of the valve assembly and contact also of surrounding portions of the lower end of the swaging tool with the upper projecting end of the valve core or body, thus pushing the valve core or body downwardly within its chuck against the pressure of the springs 4 and 5, and also depressing the washer e so as to permit the upper end of the valve pin b to extend into the space between the lugs 53 of the jaws of the swaging tool.

The relative length of the shank end of plunger 39 is such that, when surfaces 39'—40' are in contact, there will be no contact between the lower face of swaging tool 47 and the top surface of the axially aligned chuck. Hence, the only vertical pressure exerted upon the carrier disk by downward movement of the swaging head 32, will be the accumulated pressure produced by compression of the three springs d, 4 and 5.

With the parts in this position, the swaging tool has descended as far as possible, and further downward movement imparted by the rocker arm 31 will be reflected in movement of the sleeve 45 relatively to the plunger 39 and swaging tool 47 until such movement is arrested by engagement of the annular shoulder 56 of the sleeve with a washer or shim 57 of predetermined appropriate thickness. While this relative movement is taking place, the complementally chamfered faces 51 and 52 of the swaging tool 47 and sleeve 45, respectively, will cooperate to compress the jaws of the swaging tool radially so that their edges 54 will bite into the embraced end portion of the valve pin b and will swage or expand it, as illustrated in Fig. 7, to such an extent that it will substantially fill the recess g of the washer e and will prevent disengagement of this washer and the valve spring d from the valve body or core, at the same time completing the assembly of the parts of the valve within, and in axial relation to, the core or body.

It will be noted that while this swaging operation is taking place, the valve member c of the valve pin is supported by the plunger 2 of the chuck, and hence the valve member will be held in proper relation to the valve body, as the tendency of the plunger 2 during this operation is always to force the valve to its seat in the body or core.

As the swaging head recedes upwardly, relative movement of its parts will take place in the reverse order to that described, and the swaged or deformed and expanded end portion of the valve pin will be released, and the whole valve assembly permitted to re-assume the position in the chuck illustrated in Fig. 6, except as respects washer e.

It will be understood that during this swaging operation upon one valve assembly, the spinning operation will be performed on another valve assembly which has already undergone the swaging operation but has advanced into position in axial alignment with the spinner head.

Referring to Figs. 10 to 14 inclusive, and also Figs. 4 and 6, it will be seen that as the cam 33 rotates, the push rod 34 will lower, carrying with it the spinner head 36 which is adjustably mounted upon it by means of the split collar 58 and arm 59. Cam-following depression of the push rod 34 is accomplished by the compression spring 60, Fig. 4, which bears against an abutment 65 carried by the spring stop link 35 which latter is rigidly supported upon a post 66 fixed in the stationary frame member 41. Thus, the spinner head is advanced to its work by resilient pressure which may be appropriately controlled by the spring 60.

The spinner head 36 includes a suitable source of spinning power, preferably an air motor 67, appropriately clamped in the head by a split collar 68 thereof. This air motor may receive air through a tube 69 connected with an appropriate source of compressed air.

The air motor may be of any approved commercial form and its spindle 70 is provided with a chock 71 in which is clamped the spinning tool 72. This spinning tool (see particularly Figs. 12 and 13) has a stem 73 the axis of which is eccentric to the axis of rotation of the tool 72 so as to produce a wobbling motion as the tool spins. An eccentricity of .010 inch has been found appropriate, but this may be varied to suit conditions of use. The lower operative spinning or burnishing end of the stem 73 is provided with a hemispherical recess 74 furnishing the operative portion of the stem for engagement with the swaged or deformed end of the valve pin.

The spinner head is provided with a chamber 75 surrounding the chock and closed by a bottom plate 76 having a nozzle 77 enclosing the stem 73 and providing at its end an abutment for engagement with the washers of the valve assemblies, as will later appear. Within the chamber 75 thus formed, and carried by the chock of the spindle 70 is an air impeller or fan 78 (see Figs. 10 and 14) which, upon rotation of the spindle, serves to induce a current of air through an appropriate aperture or apertures 79 of the nozzle 77, Fig. 11, and an exhaust opening 80 communicating with the chamber, Figs. 1, 2 and 15, whereby small metal chips and dust produced during the spinning or burnishing operation may be exhausted and thus prevented from entering the valve assembly.

The air motor and the spinning tool carried thereby may, if desired, operate continuously during operation of the apparatus, or may be manually controlled by means of a valve lever 81, so that the spinning operation conducted upon the valve pins may be regulated as required. The maximum speed of the air motor may be controlled by a valve 82 as is customary in motors of this type.

Referring particularly to Figs. 11, 6 and 7, it will be apparent that when the spinner head is lowered, the nozzle 77 will first come into contact with the washer e of the valve assembly and will depress it sufficiently to clear it from the swaged or deformed terminal of the valve pin b so that the spinning end of the stem 73 may engage the end of the pin free of interference with the washer. Obviously, when the end of the stem 73 engages the end of the valve pin b it will bring pressure to bear against the same, and this pressure will be supported temporarily by the plunger 2 of the chuck 1, and as the pressure upon the pin b increases this further pressure will be taken up by compressing spring 4 until the plunger 2 seats against the end of the abutment element or stop 4'. The purpose of gradually applying the spinning pressure is to prevent bending of the valve pin, as might be the case if the maximum pressure were applied as a shock load.

During this depression of the valve pin, the operation of spinning over and burnishing the swaged or deformed end of the pin is taking place, first against light spring pressure afforded by spring 4, then against heavier spring pressure afforded by compressing spring 4 and finally against a solid seat provided by engagement of the plunger 2 with the end of the abutment member 4'.

Upon completion of the spinning operation the spinner head recedes upwardly under the influence of the cam 33 until the valve assembly is cleared and the pin is restored by operation of the plunger 2 of the chuck to its initial position in the valve assembly.

Referring to Figs. 2, 3, 6 and 15, it will be seen that after the valve assemblies have been operated upon by the spinner head, their chucks will be indexed in radial alignment with the air ejection mechanism. This air ejection mechanism includes the valve member 38 controlled by the arm 37 in response to reciprocation of the tappet 30 under the influence of cam 29, and compressed air is supplied to the valve through a tube or the like 83, this air being intermittently released by the valve through a connection 84 into the bore 85 of a block 86 secured to the frame member 41. Within the bore 85 is arranged a spring-pressed hollow plunger 87 bearing against a pierced cup washer 88 or the like which contacts with the periphery of the rotating carrier disk 7 or 7' and conducts the air from the bore 85 through passages 89 communicating with the annular recesses formed on the peripheries of the chucks. In the chucks 1 the recesses 90 and 91 are interconnected by slots 92, but the provision of equivalent means in the chucks 1' is somewhat different as will be described hereinafter. From the annular recesses 91 of the chucks 1 the air is conducted through ducts 93 into the bores 6 of the chucks beneath the valve assemblies therein to eject the assemblies from the chucks.

Referring to the modifications of the apparatus illustrated in Figs. 18 to 28, inclusive, and to the forms of valve cores or bodies $a'$ and $a^2$, to the handling of which these modifications are particularly directed, it will be noted that the chucks 1' have bores 6' of greater diameter than those of the chucks 1. This larger diameter is such as to adapt the chucks 1' to receive and axially center the enlarged ends 94 of the cores or bodies $a'$, and is ample to accommodate the enlarged grip portions 95 of the cores or bodies $a^2$.

When assemblies of the cores or bodies $a^2$ are being made, the bores 6' are fitted with adapters 96 (Fig. 27), appropriately located and held in the bores by snap rings 97 which engage complemental grooves 98 in the walls of the bores, and provided with axial openings 99 having chamfers 100 for guiding the cores or bodies $a^2$ to position in axial alignment with the bores of the chucks.

The outwardly projecting ends of the bodies or cores $a'$ and $a^2$ are held in axial alignment with the chucks by pairs of flaps 101 carried by pivots 102 on the chucks, and these flaps are provided at their mating edges with substantially semicircular notches 103 to embrace the outwardly projecting ends of the bodies or cores.

The flaps 101 are held in open position (Figs. 22, 25 and 27) or in closed position (Figs. 23, 24 and 26) by relatively light pressure exerted by a spring 104 bearing against the cam surfaces 105 and 106, respectively, of their hinge elements.

It will be apparent, from an inspection of Fig. 20, that the sockets 107 of the carrier disk 7' are different from the sockets of the disk 7, being provided with a shouldered enlargement to receive and axially support the chucks 1' and hence when assemblies of valves using the cores or bodies $a'$ and $a^2$ are being made the disk 7' must be substituted for the disk 7.

Also a plow member 108 having appropriately angularly arranged wings 109 is attached to the bearing element 40 and properly located thereon in the line of approach of the chucks 1' by a pin 110, so that as the chucks approach the station of operation of the swaging head 32 their flaps 101, which are in open position as is necessary for introduction of the parts of the valve assembly, will be closed by engagement with the plow wings 109 so that they may properly embrace and support the cores or bodies while the various operations of the apparatus are performed.

When the chucks 1' reach the air ejecting station, compressed air controlled by the valve 38 enters them through ducts 111, and this air also passes through channels 112 and communicating bores 113 to ducts 114 which conduct it to the lower surfaces of the flaps 101 (see Figs. 23, 24, 25 and 28) so that the air serves not only to blow the finished valve assemblies from the chucks but functions also earlier to blow open the flaps 101. Although as the valve assemblies are blown out they can be depended upon to open the flaps as they emerge, such operation may result in misalignment and scattering of the assemblies as they leave the chucks, and it is preferable, therefore, to provide the air means for initially opening the flaps.

Referring to Fig. 16, wherein the cams are shown at completion of the indexing operation, as in Fig. 4, it will be seen that, as hereinbefore explained, the operation of the cam 10 (not shown in Fig. 16) for indexing the carrier disk takes place through an angle of 90° of rotation of the shaft 11. During this angle of rotation the cams 29 and 33 are inoperative to produce any movement of their associated mechanisms. However, upon completion of the disk indexing operation, these cams 29 and 33 both become operative.

The effect of the rotation of the two cams 29 and 33 will be described separately, although it is apparent, as has been described, that they function simultaneously to produce operative movement of their connected mechanisms upon valve assemblies indexed at the stations at which these mechanisms are located.

During the first 90° of rotation of the shaft 11, after indexing of the disk 7 or 7', the cam 29 will function to lower the swaging head 32 for compressing the valve cap or washer $e$ and spring $d$ preliminary to swaging. During the next 90° of rotation the jaws of the swaging tool will be closed in upon the end of the valve pin to swage or expand it. Also, during the final 45° of rotation of the last mentioned 90° rotation, the air valve 38 will be actuated to eject a finished valve assembly from the chuck then indexed in radial alignment with the air ejection means. During the final 90° of its rotation, the cam 29 will release the swaging tool and spring 31' will return the swaging head to its initial retracted position, to thus clear the valve assembly and chuck.

During the first 20° of rotation of the cam 33, after completion of the indexing operation, the nozzle 77 of the spinner head makes contact with and depresses the valve cap or washer e and the stem 73 of the spinning tool touches the exposed terminal of the swaged or deformed valve stem or pin. During the next 115° of rotation, the cam will cause the spinning tool to operate against the swaged end of the valve pin against increasing spring pressure of the spring 4 in the chuck. During the next 105° of rotation the spinning tool will continue to spin against the end of the valve pin the valve core or body being then relatively solidly supported upon the plunger 3 with the plunger 2 depressed. During the last 30° of rotation of the cam the spinner head will be upwardly retracted to clear the valve assembly and chuck.

The operation of the apparatus, in service, is substantially as follows: Referring to Fig. 2, it will be noted that operators I and II take positions at stations adjacent to the periphery of the rotating carrier disk 7 or 7' substantially 135° apart. In front of operator I, within easy reach, are arranged two trays containing, respectively, valve pins or stems and valve bodies. Two similar trays containing, respectively, valve springs and valve caps or washers are arranged within easy reach of operator II. Into each chuck, as it passes the station of operator I, during indexing of the disk, the operator loads a valve pin or stem and a valve body appropriately embracing such pin or stem, and when these partially loaded chucks reach operator II, this operator places in each valve body a valve spring and a washer or cap. Thus, the various parts of the valve assembly, namely pins or stems b with their applied valve elements c, valve bodies a, a' or a², valve springs d and caps or washers e are properly assembled, in the order named, in each chuck, it being understood, as hereinbefore pointed out, that the full expanded length of the valve spring d is not sufficient to hold its supported washer or cap to such an extent outside of the bore of the valve body as to interfere with subsequent assembly operations performed by the apparatus.

As each chuck is indexed in axial alignment with the swaging head 32, and is held in this indexed position during the 270° of rotation of the cam shaft 11 prior to the next indexing operation, the cam 29 will function, as explained in connection with the description of Figs. 6 to 9 and 16, to cause the swaging head to perform the operation of swaging or deforming the end portion of the valve pin or stem to expand it to "clover leaf" form. During this same 270° of rotation of the cam shaft, another chuck, indexed with the spinner head 36, and carrying a valve assembly the valve pin or stem of which has already been swaged, will have its pin subjected to the spinning or burnishing operation controlled by the cam 33, whereby the smoothing and rounding of the swaged end of the valve pin or stem will be accomplished as described in connection with Figs. 10 to 14 and 16.

As each chuck carrying a valve assembly, the valve pin or stem of which has been swaged and subjected to the spinning or burnishing operation, is indexed in radial alignment with the air ejecting mechanism, the valve 38 will be operated to admit a current of compressed air into this mechanism to eject the finished valve assembly from its chuck, as pointed out in the foregoing description, and into a hopper or tray for receiving the ejected, finished valves, such tray being located in substantially the position indicated in Fig. 2.

Obviously, the apparatus may operate continuously when the clutch 26—27 is engaged, or it may be intermittently operated by engagement and disengagement of this clutch, or, with the clutch disengaged, it may be operated manually by rotation of the hand wheel 12.

By employing the method and apparatus of the invention, finished valve assemblies may be produced rapidly and economically and with a minimum of hand operations. Moreover, automatic means may, if desired, be provided for feeding the various parts of the valve assemblies to the chucks of the carrier disk in proper sequence.

It will be noted that the cooperative parts of the valve are individually so formed as to lend themselves readily to appropriate cooperative assembly in the chucks of the carrier disk without undue attention on the part of the operators to the manner in which they are loaded into these chucks. The valve pins or stems b, and particularly the valve elements c carried thereby, are so shaped that when dropped into the chucks they will stand erect and substantially axially therein, and the ends of the bodies a, a' and a², which cooperate with the valve elements c in the final assembly, are so formed that when dropped into the chucks over the ends of the pins or stems they will properly locate themselves in the bores of the chucks and will center the valve stems or pins b within them. Also the valve springs d cannot be loaded into the bores in the upper portions of the bodies in any position but that encircling the upwardly extended ends of the valve pins or stems b, and the lower faces of the washers e are chamfered so that when dropped into the bores of the bodies they will be self-centering upon the cooperating ends of the pins or stems b. These features of formation of the valve parts, in addition to facilitating manual loading of them into the chucks of the apparatus, enhance their adaptability for automatic loading.

The performance of the assembling operations of swaging and spinning by automatically actuated mechanism makes possible production of valves having uniform characteristics of assembly, operation in service, and appearance. Moreover, the swaging operation performed upon the ends of the pins or stems ensures an inseparable connection of the parts, and the burnishing and shaping of the swaged and expanded end portions of the pins or stems, by spinning, not only produces a uniform, finished and attractive appearance, but removes any rough edges of which might result in faulty operation of the valves and fouling of the pins or washers in the inflating chuck of an air hose.

Various changes are considered to be within the spirit of the invention and the scope of the following claims.

What we claim is:

1. The method of assembling inflation valve parts including a body, pin, spring and washer, comprising the steps of arranging these parts in proper operative relation with the washer embracing the end portion of the pin, deforming the end portion of the pin to increase its diameter and prevent withdrawal of the washer therefrom, and thereafter burnishing the deformed terminal of the pin to provide a smooth finish thereon.

2. Apparatus for assembling inflation valve parts including a body, pin, spring and washer, comprising means for holding said parts in proper cooperative arrangement with the washer embracing the end portion of the pin, means for deforming the end portion of the pin to prevent withdrawal of the washer therefrom, and means for burnishing the deformed terminal of the pin to provide a smooth finish thereon.

3. Apparatus for assembling inflation valve parts including a body, pin, spring and washer, comprising a chuck for resiliently supporting said parts in proper cooperative arrangement with the washer embracing the end portion of the pin, means for depressing the washer and engaging and deforming the end portion of the pin to prevent withdrawal of the washer therefrom, and means for burnishing the deformed terminal of the pin, said burnishing means operating upon said pin while the latter is resiliently supported in said chuck.

4. Apparatus for assembling inflation valve parts including a body, pin, spring and washer, comprising a movable member carrying a plurality of chucks in each of which chucks a set of said parts is supported in proper operative arrangement with the washer embracing the end portion of the pin, a swaging head including means for deforming the end portion of the pin to prevent withdrawal of the washer therefrom, a spinner head having means for burnishing the deformed terminal of said pin, and means for successively and sequentially indexing said chucks with said swaging head and spinner head respectively.

5. Apparatus for assembling inflation valve parts including a body, pin, spring and washer, comprising a rotatable carrier disk provided with an annular series of chucks in each of which chucks a set of said parts is supported in proper operative ararngement with the washer embracing the end portion of the pin, a swaging head including means for deforming the end portion of the pin to prevent withdrawal of the washer therefrom, a spinner head having means for burnishing the deformed terminal of said pin, means operative to intermittently rotate said disk and to successively and sequentially index said chucks with said swaging head and spinner head respectively, and means operative in timed relation to said rotating and indexing means for imparting operative movement to said swaging head and spinner head..

6. Apparatus for assembling inflation valve parts including a body, pin, spring and washer, comprising a rotatable carrier disk provided with an annular series of chucks in each of which chucks a set of said parts is supported in proper operative arrangement with the washer embracing the end portion of the pin, a swaging head including means for deforming the end portion of the pin to prevent withdrawal of the washer therefrom, a spinner head having means for burnishing the deformed terminal of said pin, means operative to intermittently rotate said disk and to successively and sequentially index said chucks with said swaging head and spinner head respectively, means for automatically ejecting finished valve assemblies from said chucks, and means operative in timed relation to said rotating and indexing means for imparting operative movement to said swaging head and spinner head and for actuating said ejecting means.

7. Apparatus for assembling inflation valve parts including a body, pin, spring and washer, comprising a swaging head, means for supporting the valve parts in proper operative arrangement with the washer embracing the end portion of the pin and for presenting said parts in position to be operated upon by said swaging head, said head including a rod-like swaging tool having radial slits extending axially thereof and providing a plurality of integral resilient jaws for engagement with the end portion of the pin, and means for actuating said swaging head including a cam-carrying member embracing said tool and relatively movable axially thereof to close said jaws upon the end portion of the pin and deform the same and thereby prevent withdrawal of the washer.

8. Apparatus for assembling inflation valve parts including a body, pin, spring and washer, comprising a swaging head, means for supporting the valve parts in proper operative arrangement with the washer embracing the end portion of the pin and for presenting said parts in position to be operated upon by said swaging head, said head having relatively movable parts including a rod-like swaging tool having radial slits extending axially thereof and providing a plurality of integral resilient jaws for engagement with the end portion of the pin, and a sleeve embracing and relatively movable axially with respect to said tool, said tool and sleeve provided with complemental camming surfaces, and means for actuating said swaging head to cause relative movement between said sleeve and tool whereby said camming surfaces will cooperate to close said jaws upon the end portion of the pin to deform the same and thereby prevent withdrawal of the washer.

9. Apparatus for assembling inflation valve parts including a body, pin, spring and washer, comprising means for deforming the end portion of said pin to prevent withdrawal of the washer therefrom, a spinner head, means for supporting the valve parts in proper operative arrangement and in position to be operated upon by said spinner head, said head including a spinning tool and means for rapidly rotating same, and means for moving said tool into spinning engagement with the deformed terminal of said pin.

10. Apparatus for assembling inflation valve parts including a body, pin, spring and washer, comprising means for supporting the valve parts in proper operative arrangement with the washer bearing against the spring and embracing the end portion of the pin, means for deforming the end portion of the pin, a spinner head including means for depressing said washer axially of said pin, a spinning tool and means for rapidly rotating same carried by said head, and means for moving said head to depress said washer and engage said tool with the deformed terminal of said pin.

11. Apparatus for assembling inflation valve parts including a body, pin, spring and washer, comprising means for supporting the valve parts in proper operative arrangement with the washer bearing against the spring and embracing the end portion of the pin, means for deforming the end portion of the pin, a spinner head including means for depressing said washer axially of said pin, a spinning tool and means for rapidly rotating same carried by said head, means for moving said head to depress said washer and engage said tool with the deformed terminal of said pin, and means for inducing a current of air through said depressing means and past said tool for carrying away from said valve assembly chips and dust produced during the spinning operation.

12. Apparatus for assembling inflation valve parts including a body, pin, spring and washer, comprising a chuck having resiliently mounted means for supporting the valve parts in proper operative relation with the washer embracing the end portion of the pin and depressible axially thereof against the spring, said resiliently mounted means being capable of depression to a fixed seat, means for deforming the end portion of the pin, a spinner head provided with means for depressing said washer axially of said pin and having a spinning tool and means for rapidly rotating same, and means for moving said head to depress said washer and engage said tool with the deformed terminal of said pin, continued movement of said head initially exerting burnishing pressure upon said pin terminal while the pin is resiliently supported in said chuck and finally exerting such pressure while the resiliently mounted means of the chuck is depressed to its fixed seat.

13. Apparatus for assembling inflation valve parts including a body, pin, spring and washer, comprising means for deforming the end portion of said pin to prevent withdrawal of the washer therefrom, a spinner head, means for supporting the valve parts in proper operative arrangement and in position to be operated upon by said spinner head, said head including a spinning tool and means for rapidly rotating same, said tool having an operative burnishing end eccentrically arranged with respect to the axis of rotation of the tool, and means for moving said tool so that its eccentrically arranged burnishing end is brought into spinning engagement with the deformed terminal of said pin.

14. Apparatus for assembling inflation valve parts including a body, pin, spring and washer, comprising means for deforming the end portion of said pin to prevent withdrawal of the washer therefrom, a spinner head, means for supporting the valve parts in proper operative arrangement and in position to be operated upon by said spinner head, said head including a spinning tool and means for rapidly rotating same, and means including a resilient pressure mechanism for moving said tool into spinning engagement with the deformed terminal of said pin.

15. In apparatus for assembling inflation valve parts including a body, pin, spring and washer, means for movably carrying a plurality of chucks in which individual sets of said valve parts are supported, complemental closable flaps carried by said chucks and serving when closed to embrace the valve bodies supported therein, said flaps being normally in open position to accommodate said chucks to loading with valve parts, and means for automatically closing said flaps when the chucks are loaded.

16. In apparatus for assembling inflation valve parts including a body, pin, spring and washer, a rotatable disk carrying a plurality of chucks in which individual sets of said valve parts are supported, complemental closable flaps carried by said chucks and serving when closed to embrace the valve bodies supported therein, said flaps being normally in open position, and fixed means engageable with said flaps as said disk rotates and serving to impart closing movement to the flaps.

17. In apparatus for assembling inflation valve parts including a body, pin, spring and washer, means for movably carrying a plurality of chucks in which individual sets of said parts are supported and ultimately operatively assembled, complemental closable flaps carried by said chucks and serving when closed to embrace the valve bodies supported therein, said flaps being normally in open position to accommodate said chucks to loading with valve parts, means for automatically closing said flaps when the chucks are loaded, and means for introducing a pressure fluid to the chucks successively after completion of the assembly operation to open said flaps and eject the finished valve assemblies.

GEORGE G. ALLENBAUGH.
RALPH D. BIXLER.